(12) United States Patent
Kim et al.

(10) Patent No.: US 9,716,253 B2
(45) Date of Patent: Jul. 25, 2017

(54) BATTERY CASE FOR SECONDARY BATTERY

(71) Applicant: LG CHEM, LTD., Seoul (KR)

(72) Inventors: Young Hoon Kim, Daejeon (KR); Sungjin Kwon, Daejeon (KR); Dong-Myung Kim, Daejeon (KR); Ki Woong Kim, Daejeon (KR); Hyun Park, Daejeon (KR); Soonho Ahn, Seoul (KR)

(73) Assignee: LG CHEM, LTD., Seoul (KR)

( * ) Notice: Subject to any disclaimer, the term of this patent is extended or adjusted under 35 U.S.C. 154(b) by 35 days.

(21) Appl. No.: 14/315,023

(22) Filed: Jun. 25, 2014

(65) Prior Publication Data

US 2014/0308577 A1 Oct. 16, 2014

Related U.S. Application Data

(63) Continuation-in-part of application No. 13/839,783, filed on Mar. 15, 2013, now abandoned, which is a
(Continued)

(30) Foreign Application Priority Data

Mar. 23, 2012 (KR) .................. 10-2012-0029643

(51) Int. Cl.
*H01M 2/02* (2006.01)

(52) U.S. Cl.
CPC ......... *H01M 2/0202* (2013.01); *H01M 2/026* (2013.01); *H01M 2/0207* (2013.01);
(Continued)

(58) Field of Classification Search
CPC ............ H01M 2/0202; H01M 2/0207; H01M 2/0287; H01M 2/0257; H01M 2/026; H01M 2/0267; H01M 2/0275; H01M 2/0277; H01M 2/028; H01M 2/0285; H01M 2002/0297
See application file for complete search history.

(56) References Cited

U.S. PATENT DOCUMENTS 4,951,537 A * 8/1990 Bennett ................ B21D 45/006
267/119
6,224,995 B1 5/2001 Fauteux et al.
(Continued)

FOREIGN PATENT DOCUMENTS

CN 101264495 A 9/2008
CN 102310147 A 1/2012
(Continued)

OTHER PUBLICATIONS

Extended European Search Report, dated Aug. 27, 2015, for European Application No. 13764010.8.

*Primary Examiner* — Scott J Chmielecki
(74) *Attorney, Agent, or Firm* — Birch, Stewart, Kolasch & Birch, LLP (57) ABSTRACT

Disclosed herein is a battery case including a receiving part having an electrode assembly mounted therein, wherein the receiving part, which is formed by deforming a sheet type base material, is configured to have a stair-like structure in which at least one corner and/or surface forming a shape of the receiving part is deformed.

7 Claims, 9 Drawing Sheets

Related U.S. Application Data continuation of application No. PCT/KR2013/002116, filed on Mar. 15, 2013.

(52) U.S. Cl.
CPC ......... *H01M 2/028* (2013.01); *H01M 2/0257* (2013.01); *H01M 2/0267* (2013.01); *H01M 2/0275* (2013.01); *H01M 2/0277* (2013.01); *H01M 2/0285* (2013.01); *H01M 2/0287* (2013.01); *H01M 2220/30* (2013.01); *Y10T 29/53139* (2015.01)

(56) References Cited

U.S. PATENT DOCUMENTS

| | | | |
|---|---|---|---|
| 2001/0005561 A1 | 6/2001 | Yamada et al. | |
| 2006/0147672 A1 | 7/2006 | Ruiz | |
| 2007/0264353 A1* | 11/2007 | Myntti | A61K 31/10 424/600 |
| 2007/0264535 A1* | 11/2007 | Lee | H01M 2/0207 429/7 |
| 2009/0075168 A1 | 3/2009 | Lee | |
| 2009/0167037 A1 | 7/2009 | Czopek et al. | |
| 2009/0263712 A1 | 10/2009 | Mizuta et al. | |
| 2011/0091766 A1* | 4/2011 | Kim | H01M 2/021 429/176 |
| 2011/0287308 A1* | 11/2011 | Kim | B29C 43/18 429/176 |
| 2012/0015236 A1 | 1/2012 | Spare | |

FOREIGN PATENT DOCUMENTS

| | | | |
|---|---|---|---|
| JP | 2001-28275 A | 1/2001 | |
| JP | 2001-167743 A | 6/2001 | |
| JP | 2002-208384 A | 7/2002 | |
| JP | 2003-234094 A | 8/2003 | |
| JP | 2005-129267 A | 5/2005 | |
| JP | 2010-192154 A | 9/2010 | |
| JP | 2011-71133 A | 4/2011 | |
| KR | 10-2003-0066960 A | 8/2003 | |
| KR | 10-0778981 B1 | 11/2007 | |
| KR | 10-2012-0006235 A | 1/2012 | |
| KR | 10-2012-0014267 A | 2/2012 | |
| WO | WO 2012/009423 A1 | 1/2012 | |

\* cited by examiner

FIG. 1

Prior Art

BATTERY CASE FOR SECONDARY BATTERY

CROSS REFERENCE TO RELATED APPLICATIONS

This application is a Continuation-in-Part of U.S. application Ser. No. 13/839,783, filed on Mar. 15, 2013, which is a Continuation of PCT International Application No. PCT/KR2013/002116, filed on Mar. 15, 2013, which claims priority under 35 U.S.C. 119(a) to Patent Application No. 10-2012-0029643 filed in the Republic of Korea on Mar. 23, 2012. The entire contents of all of the above applications are hereby expressly incorporated by reference into the present application.

TECHNICAL FIELD

The present invention relates to a battery case for secondary batteries of a novel structure and, more particularly, to a battery case including a receiving part having an electrode assembly mounted therein, wherein the receiving part, which is formed by deforming a sheet type base material, is configured to have a stair-like structure in which at least one corner and/or surface forming a shape of the receiving part is deformed.

BACKGROUND ART

A secondary battery has been widely used as a power source for mobile devices, such as a mobile phone, a laptop computer, and a camcorder. In particular, the use of a lithium secondary battery has been rapidly increased because the lithium secondary battery has high operating voltage and high energy density per unit weight.

Based on the construction of electrodes and an electrolyte, the lithium secondary battery may be classified as a lithium ion battery, a lithium ion polymer battery or a lithium polymer battery. In particular, the lithium ion polymer battery has been increasingly used because the lithium ion polymer battery has a low possibility of electrolyte leakage and can be easily manufactured.

The lithium ion polymer battery (LiPB) is configured to have a structure in which an electrode assembly manufactured by thermally welding electrodes (cathodes and anodes) and separators is impregnated with an electrolyte. Generally, the lithium ion polymer battery is configured to have a structure in which the electrode assembly is mounted in a pouch-shaped battery case formed of an aluminum laminate sheet in a sealed state. For this reason, the lithium ion polymer battery is often referred to as a pouch-shaped battery.

Figure 1:
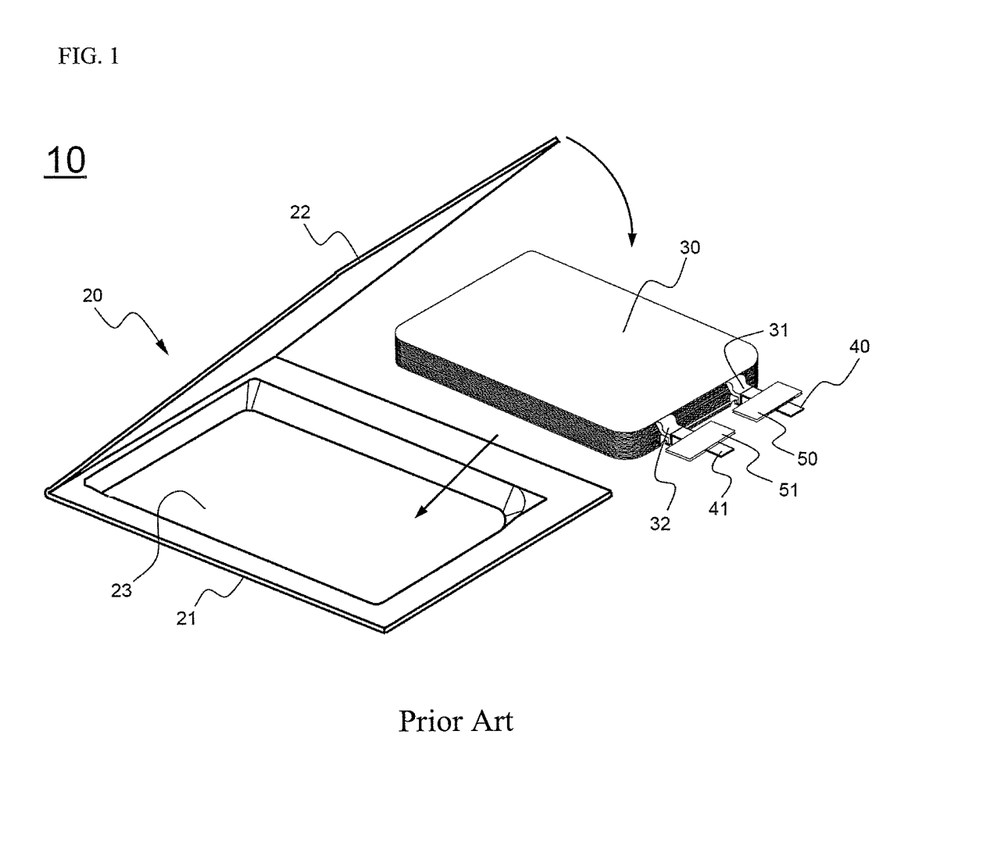
FIG. 1 is an exploded view showing a conventional lithium secondary battery.

FIG. 1 is a view typically showing a general structure of a representative secondary battery including a stacked type electrode assembly.

Referring to FIG. 1, a secondary battery 10 is configured to have a structure in which an electrode assembly 30, including cathodes, anodes and separators disposed respectively between the cathodes and the anodes, is mounted in a pouch-shaped battery case 20, cathode and anode tabs 31 and 32 of the electrode assembly 30 are welded to two electrode leads 40 and 41, respectively, and the electrode assembly 30 is sealed in the battery case 20 in a state in which the electrode leads 40 and 41 are exposed to the outside of the battery case 20.

The battery case 20 is formed of a soft wrapping material, such as an aluminum laminate sheet. The battery case 20 includes a case body 21 having a hollow receiving part 23, in which the electrode assembly 30 is located, and a cover 22 connected to the case body 21 at one side thereof.

The electrode assembly 30 of the secondary battery 10 may be configured to have a jelly roll type structure or a stacked/folded type structure in addition to the stacked type structure shown in FIG. 1. The stacked type electrode assembly 30 is configured to have a structure in which the cathode tabs 31 and the anode tabs 32 are welded to the electrode leads 400 and 410, respectively.

The battery case 20 of the secondary battery is manufactured by pressing a sheet type base material, e.g. a base material of an aluminum laminate sheet, using a punch formed in the shape of a rectangular parallelepiped corresponding to the receiving part 23 and cutting the deformed sheet type base material so as to have a size corresponding to a cover in the longitudinal direction of the receiving part 23 and to a gas pocket in the lateral direction of the receiving part 23.

In recent years, however, a new type of battery cell is required in accordance with a slim type design trend or various other design trends. On the other hand, conventional battery cells are configured to include electrode assemblies having the same size or capacity and battery cases corresponding to the electrode assemblies. For this reason, in order to manufacture a battery cell of a novel structure in consideration of the design of a device, to which the battery cell is applied, it is necessary to reduce the capacity of the battery cell or change the design of the device so that the size of the device is increased.

In addition, electrical connection is complicated during change in design of the device, and therefore, it is difficult to manufacture a battery cell satisfying desired conditions.

Meanwhile, for a secondary battery, an electrode assembly is mounted in a receiving part, the receiving part is covered by a cover such that the receiving part is sealed, a contact portion between the cover and a main body is thermally welded, and an activation and aging step is performed. In order to remove gas generated at this time, the activation step is performed in a state in which a battery case having a gas pocket is primarily sealed. The gas is removed through the gas pocket, sealing is performed again according to the size corresponding to the receiving part, and the gas pocket is cut off. In this way, the secondary battery is manufactured.

In the pouch-shaped battery, however, a base material extends in a thickness direction of the receiving part in a state in which stress is inherent during pressing of the base material using a punch to form the receiving part with the result that it is difficult to accurately form a forming width of the receiving part. The thickness direction of the receiving part means the vertical direction or the direction in which the electrodes of the electrode assembly are stacked in the receiving part and the forming width of the receiving part means the width of the receiving part formed in the direction perpendicular to the thickness direction of the receiving part.

Figure 2:
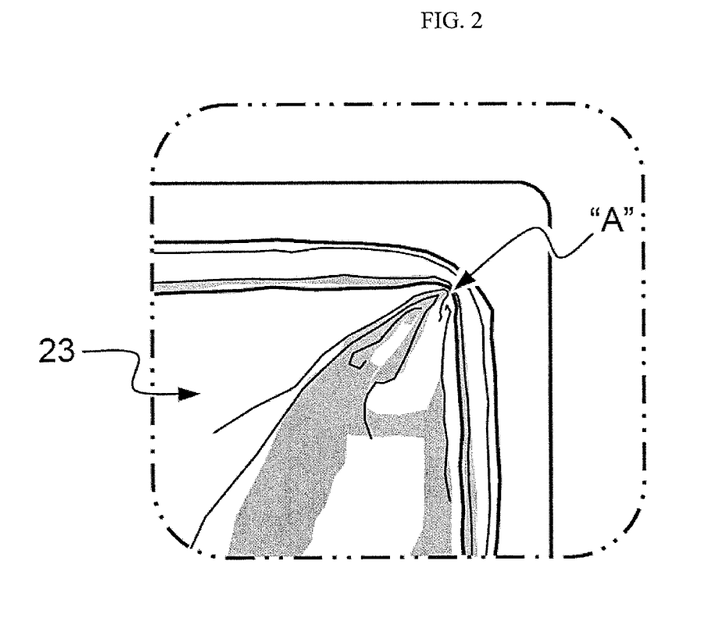
FIGS. 2 and 3 are partially enlarged views showing a receiving part of FIG. 1.
Figure 3:
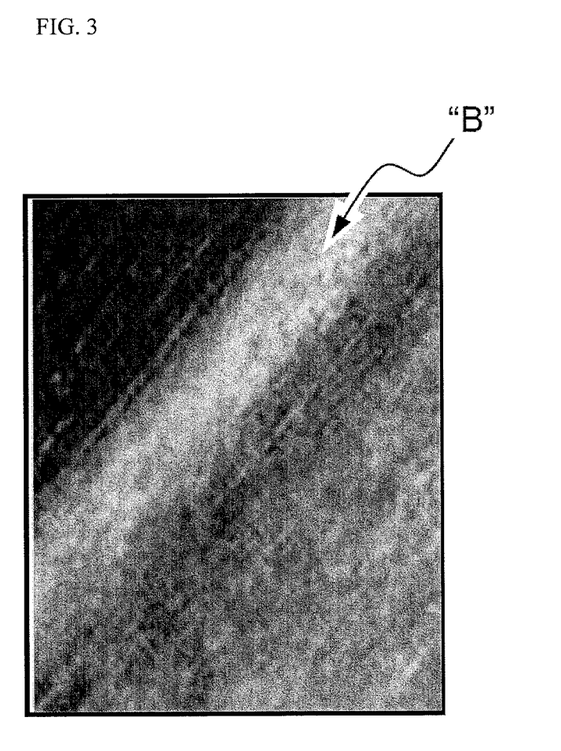

That is, when the base material is pressed to have the shape of a rectangular parallelepiped, wrinkles A or chlorosis B occurs at the corners of the receiving part as shown in FIGS. 2 and 3 with the result that moisture may penetrate into the battery.

Therefore, there is a high necessity for a technology that is capable of securing the space of a receiving part, in which electrode assemblies formed in various shapes are mounted, while fundamentally solving the above problems.

DISCLOSURE

Technical Problem

Therefore, the present invention has been made to solve the above problems, and other technical problems that have yet to be resolved.

Specifically, it is an object of the present invention to provide a battery case including a receiving part corresponding to electrode assemblies formed in various shapes to exhibit high power and large capacity.

It is another object of the present invention to provide a battery case in which a portion of a sheet type base material at which a receiving part is to be formed is pressed by a punch formed in a novel shape to form the receiving part, thereby improving accuracy of the receiving part and securing safety.

Technical Solution

In accordance with one aspect of the present invention, the above and other objects can be accomplished by the provision of a battery case including a receiving part having an electrode assembly mounted therein, wherein the receiving part, which is formed by deforming a sheet type base material, is configured to have a stair-like structure in which at least one corner and/or surface forming a shape of the receiving part is deformed.

In a conventional battery case, a receiving part, in which an electrode assembly is mounted, is configured to have a structure in which the planar shape of the inner circumference of the receiving part is symmetric with respect to a central axis of the receiving part or to have a structure in which the vertical sectional shape of the receiving part is straight at flat side surfaces and a lower end of the receiving part. For example, the planar shape of a cylindrical type or coin type battery case is symmetrically circular, and the vertical sectional shape of the cylindrical type or coin type battery case is straight at the side surfaces and the lower end of the battery case. Also, the planar shape of a prismatic or pouch-shaped battery case having a thin hexahedral structure is symmetrically square or rectangular, and the vertical sectional shape of the prismatic or pouch-shaped battery case is straight at the side surfaces and the lower end of the battery case.

On the other hand, the battery case according to the present invention is configured to have a stair-like structure in which at least one corner and/or surface forming the shape of the receiving part is deformed unlike the conventional battery case.

In the present invention, therefore, the "corner and/or surface is deformed" means that the planar shape of the inner circumference of the receiving part is not symmetric with respect to a central axis of the receiving part and/or the vertical sectional shape of the receiving part is not straight at at least one selected from among the side surfaces and the lower end surface of the receiving part.

Such deformation may take various forms as will be described below. Deformation satisfying the above conditions must be interpreted to fall within the scope of the present invention.

The base material may be formed of a laminate sheet including a metal layer and a resin layer suitable for, for example, a pouch-shaped battery. Specifically, the base material may include an upper layer of a first polymer resin, an intermediate layer of a blocking metal and a lower layer of a second polymer resin. Specifically, the first polymer resin may be a thermally weldable polymer material, e.g. a cast polypropylene resin. The blocking metal may be, for example, aluminum. The second polymer resin may be a resin exhibiting excellent weather resistance, such as a nylon resin, a polyethylene terephthalate resin, or a polyethylene naphthalate resin. However, the material is not limited to the above examples.

In addition, the size of the battery case is greatly increased and the thickness of the battery case is greatly decreased according to a trend for large capacity. Specifically, the base material, to which the present invention is applied, may have a thickness of 0.3 mm to 6 mm.

In a concrete example, the receiving part may have a side wall configured to have a stair-like structure including two or more steps and the steps may have heights gradually decreased in a depth direction of the receiving part. In this structure, it is possible to minimize the change in thickness of the receiving part due to elongation of the sheet type base material during formation of the receiving part since the heights of the steps are gradually decreased in the depth direction of the receiving part.

Specifically, in a case in which the stair-like structure includes n steps, an n-th step may be located at the lowermost end of the stair-like structure in the depth direction of the receiving part, an (n−1)-th step may be located at the top of the n-th step, and the n-th step may have a smaller height than the (n−1)-th step.

For example, in a case in which the stair-like structure includes three steps, a first step may be located at the lowermost end of the stair-like structure in the depth direction of the receiving part, a second step may be located at the top of the first step, and the second step may have a smaller height than the first step. In addition, a third step may be located at the top of the second step and the third step may have a smaller height than the second step. Consequently, the heights of the first step, the second step, and the third step may be gradually decreased.

In a concrete example, the height of the n-th step may be equivalent to 50 to 90% of that of the (n−1)-th step. That is, the height of the second step may be equivalent to 50 to 90% of that of the first step and the height of the third step may be equivalent to 50 to 90% of that of the second step.

In the present invention, therefore, the "heights of the respective steps are different from each other" may mean that an elongation ratio of the sheet type base material, from which the receiving part is formed, is changed during formation of the respective steps.

As a result, the thickness of the side wall of the receiving part at the n-th step may be equivalent to 90 to 99% of that of the side wall of the receiving part at the (n−1)-th step. That is, the thickness of the side wall of the receiving part at the second step may be equivalent to 90 to 99% of that of the side wall of the receiving part at the first step and the thickness of the side wall of the receiving part at the third step may be equivalent to 90 to 99% of that of the side wall of the receiving part at the second step. Consequently, the thickness of the side wall of the receiving part is relatively uniform although the receiving part is deeply formed including a plurality of steps, thereby securing overall durability of the battery case.

In accordance with another aspect of the present invention, there is provided a method of manufacturing a battery cell having an electrode assembly mounted in the battery case with the above-stated construction.

The battery cell manufacturing method includes (a) placing a sheet type base material on a die having a groove, (b) pressing the sheet type base material into the groove of the die using a punch, an outside of which is configured to have an asymmetric structure, such that wrinkles and chlorosis do not occur at corners of a receiving part formed from the sheet type base material, (c) mounting an electrode assembly in the receiving part, and (d) placing a cover on the receiving part to seal the receiving part, wherein the groove of the die is formed in a shape corresponding to that of an outside of the punch such that the sheet type base material coincides with the shape of the outside of the punch when the sheet type base material contacts the punch and the groove of the die.

The punch may be formed in various three-dimensional shapes. In a concrete example, a stair-like structure may be formed at the bottom of the punch.

In this case, the stair-like structure may be formed at the middle, one side, or one corner of the bottom of the punch. Alternatively, other structures may be employed. For example, the stair-like structure may be formed at the bottom of the punch such that the stair-like structure slightly deviates from the middle of the bottom of the punch.

The battery case may be pressed by the punch having the stair-like structure such that the receiving part of the battery case has a stair-like structure corresponding to the punch.

According to circumstances, the battery cell manufacturing method may further include forming a vacuum in a space defined between the die and the sheet type base material between step (b) and step (c) such that the sheet type base material comes into tight contact with the groove of the die.

To this end, an opening may be formed at one side of the groove of the die to remove air from the space defined between the die and the sheet type base material. In this structure, the sheet type base material is pressed by the punch at step (b) and then a vacuum is formed in the space defined between the die and the sheet type base material. As a result, the sheet type base material is pulled to the groove of the die. Consequently, the sheet type base material may more accurately coincide with the shape of the groove of the die. In this method, the punch and the die apply force to the sheet type base material. Consequently, the receiving part is formed so as to more accurately coincide with the shape of the punch and the die. In addition, force is more uniformly distributed to the sheet type base material during pressing. As a result, it is possible to manufacture the receiving part and the battery case without wrinkles and chlorosis.

A vacuum may be applied to any pressing processes using other punches. In particular, the vacuum may be applied to all processes or only one process using a specific punch.

In another concrete example, the die may be provided with a depressed part configured to have a stair-like structure comprising an upper step, a middle step, and a lower step and the punch may include a first punch corresponding to a shape of the upper step of the die, a second punch corresponding to a shape of the middle step of the die, and a third punch corresponding to a shape of the lower step of the die.

Specifically, the second punch may be formed in a shape corresponding to the shapes of the upper step and the middle step of the die and the third punch may be formed in a shape corresponding to the shapes of the upper step, the middle step, and the lower step of the die.

The battery case having the stair-like structure may be manufactured by placing the sheet type base material on the die, (i) pressing the sheet type base material using the first punch to transfer the shape of the upper step of the die to the sheet type base material, (ii) pressing the sheet type base material using the second punch to transfer the shapes of the upper step and the middle step of the die to the sheet type base material, and (iii) pressing the sheet type base material using the third punch to transfer the shapes of the upper step, the middle step, and the lower step of the die to the sheet type base material.

The battery case forming method as described above has an effect in that when the battery case is formed to have a stair-like structure having two or more steps, it is possible to maximally restrain concentration of stress at corners of the respective steps. That is, when the side wall is formed at the receiving part to manufacture the battery case having the stair-like structure, a portion of the side wall is formed and then another portion of the side wall is formed. Consequently, it is possible to minimize stress applied to the sheet type base material when the sheet type base material is elongated. In addition, the corners forming the stair-like structure of the punch may be rounded to further improve such an effect, thereby further restraining concentration of stress.

In addition, in the same manner as in the previous example, the method may further include forming a vacuum in a space defined between the die and the sheet type base material such that the sheet type base material comes into tight contact with the groove of the die after step (iii) is performed.

In a further concrete example, the punch may include two or more punches having different widths and heights, the die may be provided at an inside thereof with a stair-like structure including steps formed in shapes corresponding to the respective punches, and the receiving part may have a stair-like structure formed by the punch and the die.

The stair-like structure of the receiving part may be formed by pressing performed using one of the punches having the largest width and by pressing performed using the punches having the next largest widths. The pressed depth of the sheet type base material may be decreased as the sheet type base material is pressed using the punches in reverse order of width.

Specifically, in a case in which the number of the punches is n, the pressed depth of the sheet type base material formed by the n-th punch may be equivalent to 60 to 90% of that of the sheet type base material formed by the (n−1) th punch.

In this manufacturing method, it is possible to minimize the change in thickness of the receiving part due to elongation of the sheet type base material during formation of the receiving part since the heights of the steps are decreased in the depth direction of the receiving part. As a result, the thickness of the side wall of the receiving part is relatively uniform, thereby securing overall durability of the battery case.

In accordance with a further aspect of the present invention, there is provided an apparatus for manufacturing the battery case with the above-stated construction.

The battery case manufacturing apparatus includes a first die including a punching die having a punch to press a battery case sheet mounted at a bottom thereof and a stripper to fix the battery case sheet between the stripper and a stationary die during a drawing process and a second die including a block die having a block corresponding to the punch mounted at a top thereof, the stationary die to fix the battery case sheet between the stripper and the stationary die, and a mounting die having a depressed part, in which the block die is variably mounted.

In the battery case manufacturing apparatus with the above-stated construction, a specific combination of various dies is operated to draw a portion of the battery case sheet at which an electrode assembly receiving part will be formed in a state in which the dies are in tight contact with the battery case sheet above and below the battery case sheet during a series of processes. Consequently, it is possible to fundamentally prevent the occurrence of wrinkles at the outer surface of the battery case, which may occur as the sheet outside the receiving part of the battery case is pushed into the inside of the receiving part during manufacture of the battery case, thereby preventing product defects.

Effects of the Invention

As is apparent from the above description, in the battery case according to the present invention and the manufacturing method of the same, at least one corner and/or surface forming the shape of the receiving part is deformed to configure the stair-like structure. Consequently, it is possible to provide a battery case including a receiving part corresponding to an electrode assembly having various shapes, thereby maximizing the capacity of a device per unit volume.

In addition, the heights of the steps are gradually decreased in the depth direction of the receiving part, and therefore, it is possible to minimize the change in thickness of the receiving part due to elongation of the sheet type base material during formation of the receiving part, thereby securing overall durability of the battery case.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 4:
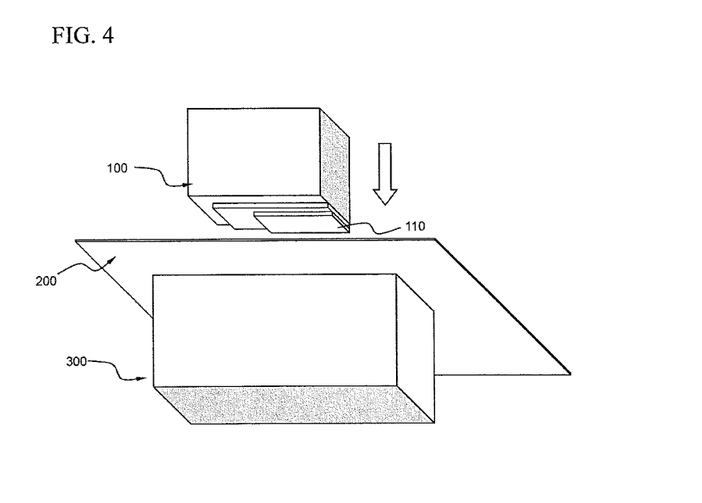
FIG. 4 is a typical view showing a punch, a base material, and a die to manufacture a battery case according to an embodiment of the present invention.

FIG. 4 is a typical view showing a punch, a base material, and a die to manufacture a battery case according to an embodiment of the present invention.

Referring to FIG. 4, a sheet type base material 200 is formed of a laminate sheet including a resin layer and a metal layer. Specifically, the base material includes an upper layer of a first polymer resin, an intermediate layer of a blocking metal, and a lower layer of a second polymer resin. During manufacture of a battery, the upper layer of the first polymer resin is thermally welded to each other, thereby achieving sealing.

Specifically, a method of manufacturing a battery case from a sheet type base material 200 using a punch formed in a shape corresponding to a receiving part (not shown), in which an electrode assembly is mounted, is carried out as follows. First, the sheet type base material 200 is loaded on a die 300. The die 300 is provided with a groove (not shown) having an inside shape corresponding to the shape of a punch 100. As the base material 200 is pressed by the punch 100, therefore, a receiving part (not shown) is formed.

A method of forming the receiving part is carried out using one punch. The method of forming the receiving part includes a process of pressing the punch to a sheet type base material to form the receiving part. Since the punch has a novel structure, the receiving part may be formed without wrinkles and chlorosis.

A stair-like structure 110 is formed at one corner of the bottom of the punch 100 in a pressing direction (in a direction indicated by an arrow). In another embodiment, the stair-like structure 110 may be formed at the middle, one side, or one corner of the punch 100.

In addition, the method of manufacturing the battery case may further include a process of applying a vacuum to the die 300. More specifically, a vacuum may be formed in a space defined between the sheet type base material 200 and the die 300. In order to remove air from the space defined between the sheet type base material 200 and the die 300, therefore, an opening (not shown) may be formed at one side of the groove of the die 300. As described above, the sheet type base material 200 is pressed by the punch 100 and a vacuum is formed in a space defined between the sheet type base material 200 and the die 300. As a result, the sheet type base material 200 is pulled to the groove of the die 300. Consequently, the sheet type base material 200 may more accurately coincide with the shape of the groove of the die 300. In this method, the punch 100 and the die 300 apply force to the sheet type base material 200. Consequently, the receiving part is formed so as to more accurately coincide with the shape of the punch 100 and the die 300. In addition, more uniform force is distributed to the sheet type base material 200 during pressing. As a result, it is possible to manufacture the receiving part and the battery case without wrinkles and chlorosis.

Figure 5:
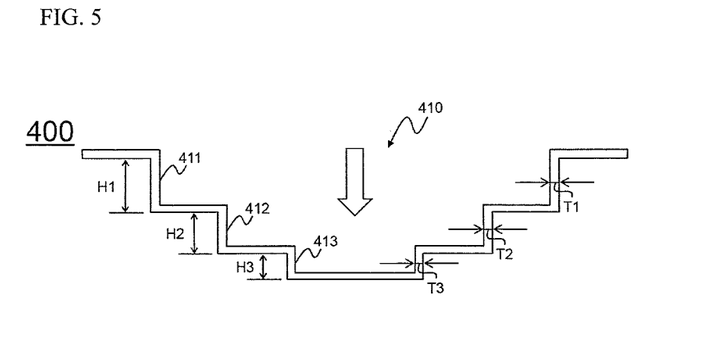
FIG. 5 is a vertical sectional view showing a battery case according to another embodiment of the present invention.

FIG. 5 is a vertical sectional view showing a battery case according to another embodiment of the present invention.

Referring to FIG. 5, a battery case 40 includes a receiving part 410 having a structure depressed in a direction indicated by an arrow. The receiving part 410 is configured to have a stair-like structure including a first step 411, a second step 412, and a third step 413. The steps 411, 412, and 413 have heights H1, H2, and H3, which are gradually decreased in the direction indicated by the arrow. The height H2 of the second step 412 is equivalent to 50 to 90% of the height H1 of the first step 411 and the height H3 of the third step 413 is equivalent to 50 to 90% of the height H2 of the second step 412.

In addition, a thickness T2 of the second step 412 is equivalent to 90 to 99% of a thickness T1 of the first step 411 and a thickness T3 of the third step 413 is equivalent to 90 to 99% of the thickness T2 of the second step 412. As a result, the thickness of a side wall of the receiving part 410 is relatively uniform, thereby securing overall durability of the battery case 400.

Figure 6:
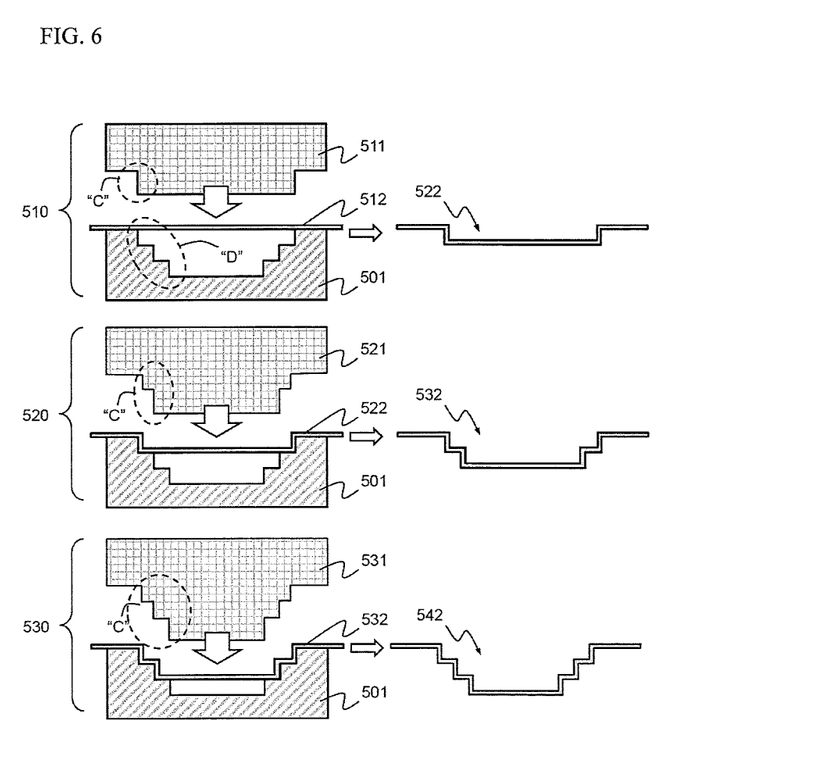
FIG. 6 is a typical view showing a battery case manufacturing process according to another embodiment of the present invention.
Figure 7:
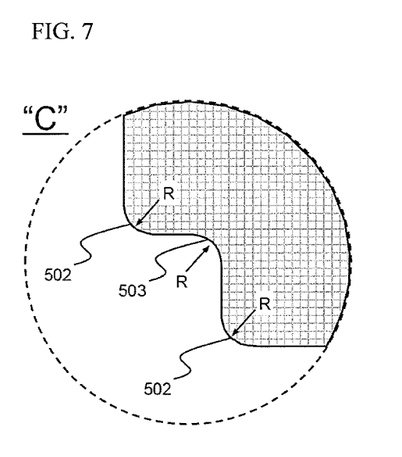
FIGS. 7 and 8 are partially enlarged views of FIG. 6.
Figure 8:
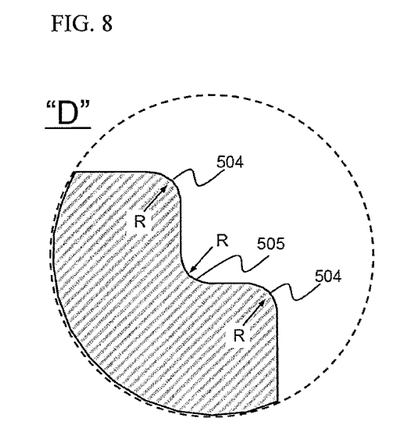

FIG. 6 is a typical view showing a battery case manufacturing process according to another embodiment of the present invention. FIGS. 7 and 8 are partially enlarged views of FIG. 6.

Referring to these drawings, three drawing processes 510, 520, and 530 are carried out to manufacture a battery case 542 having three steps. Specifically, three punches 511, 521, and 531 corresponding to the respective steps are used with respect to a stationary die 501 in the three drawing processes 510, 520, and 530. More specifically, the stationary die 510 is provided with a depressed part having a stair-like structure including an upper step, a middle step, and a lower step. One of the three punches 511, 521, and 531, e.g. the punch 511 having the largest width and the smallest height, first performs the drawing process 510. The outside of the first punch 511 is formed in a shape corresponding to the upper step of the stationary die 501. Subsequently, the punch 521 having the second largest width and the second smallest height performs the drawing process 520 and then the punch 531 having the smallest width and the largest height performs the drawing process 530. The punches 521 and 531 used to perform the drawing processes following the first drawing process 510 may be formed in shapes corresponding to the previously formed steps in addition to steps to be formed. That is, the outside of the next punch used after one step is formed corresponds to the previously formed step in addition to a step to be formed. In this method, the shape of a base material that has already been elongated or deformed to form the step may be re-stamped during the following processes. The outside of the second punch 521 corresponds to the shape of the middle step of the stationary die 501 as well as the shape of the upper step of the stationary die 501. In addition, the outside of the third punch 531 corresponds to the shapes of the upper step, the middle step, and the lower step of the stationary die 501. In this way, the drawing processes 510, 520, and 530 are performed for the respective steps, thereby maximally restraining concentration of stress at corners of the respective steps.

The apparatus shown in FIG. 6 is used as follows.

First, a sheet type base material 512 is placed on the stationary die 501. The sheet type base material 512 is pressed between the stationary die 501 and the first punch 511 such that the sheet type base material 512 corresponds to the shape of the upper step of the stair-like structure. As a result, the sheet type base material 512 is deformed into a sheet type base material 522. The sheet type base material 522 is pressed between the stationary die 501 and the second punch 521 such that the sheet type base material 522 corresponds to the shapes of the upper step and the middle step of the stair-like structure. As a result, the sheet type base material 522 is deformed into a sheet type base material 532. The sheet type base material 532 is pressed between the stationary die 501 and the third punch 531 such that the sheet type base material 532 corresponds to the shapes of the upper step, the middle step, and the lower step of the stair-like structure. As a result, the sheet type base material 532 is deformed into a sheet type base material 542. Consequently, a receiving part having the stair-like structure is formed at the sheet type base material 542.

In addition, as shown in FIGS. 7 and 8, some of the corners forming the outer shapes of the punches 511, 521, and 531 and a stationary die 501, e.g. corners 502, 503, 504, and 505 contacting a battery case sheet (not shown), are rounded as indicated by reference symbol R.

Meanwhile, the method using the apparatus shown in FIG. 6 may include a process of applying a vacuum to the stationary die 501 as previously described in connection with the embodiment shown in FIG. 4. A vacuum may be applied to any pressing processes using other punches. In particular, the vacuum may be applied to all processes or only one process using a specific punch.

Figure 9:
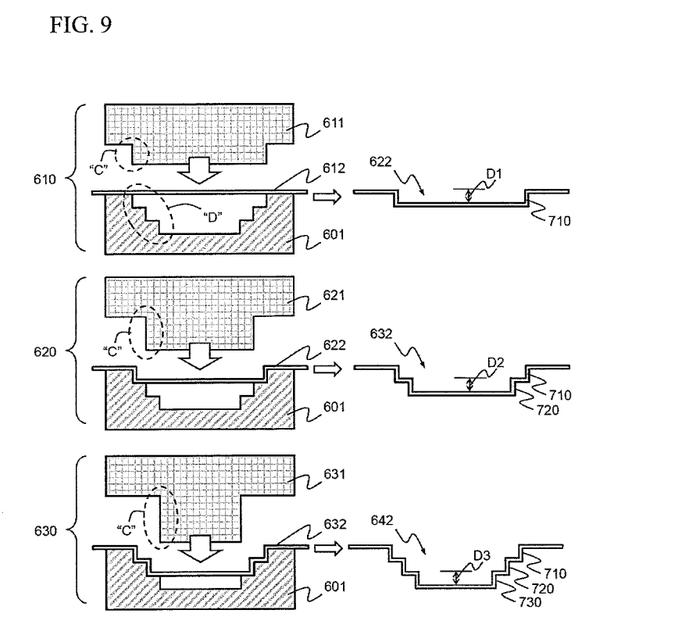
FIG. 9 is a typical view showing a process of manufacturing the battery case of FIG. 5.

FIG. 9 is a typical view showing a process of manufacturing the battery case of FIG. 5.

Referring to FIG. 9, three drawing processes 610, 620, and 630 are carried out to manufacture a battery case 642 having three steps 710, 720, and 730. Three punches 611, 621, and 631 corresponding to the respective steps 710, 720, and 730 are used in the three drawing processes 610, 620, and 630. Specifically, in the first drawing process 610, a sheet type base material 612 is placed and fixed on the stationary die 601 and the sheet type base material 612 is pressed using the first punch 611 to form a battery case 622 having the first step 710. In the second drawing process 620, the battery case 622 is pressed using the second punch 621, which has a smaller width and a larger height than the first punch 611, to form a battery case 632 further having the second step 720. At this time, a depth D2 of the battery case 632 formed by the second punch 621 is equivalent to 60 to 90% of a depth D1 of the battery case 622 formed by the first punch 611. In the third drawing process 630, the battery case 632 is pressed using the third punch 631, which has a smaller width and a larger height than the second punch 621, to form a battery case 642 further having the third step 730. In the same manner as in the second drawing process 620, a depth D3 of the battery case 642 formed by the third punch 631 is equivalent to 60 to 90% of the depth D2 of the battery case 632 formed by the second punch 621.

In this way, the drawing processes 610, 620, and 630 are performed for the respective steps, thereby maximally restraining concentration of stress at corners of the respective steps 710, 720, and 730.

In addition, as shown in FIGS. 7 and 8, some of the corners forming the outer shapes of the punches and the stationary die, e.g. corners contacting the battery case sheet, may be rounded.

Figure 10:
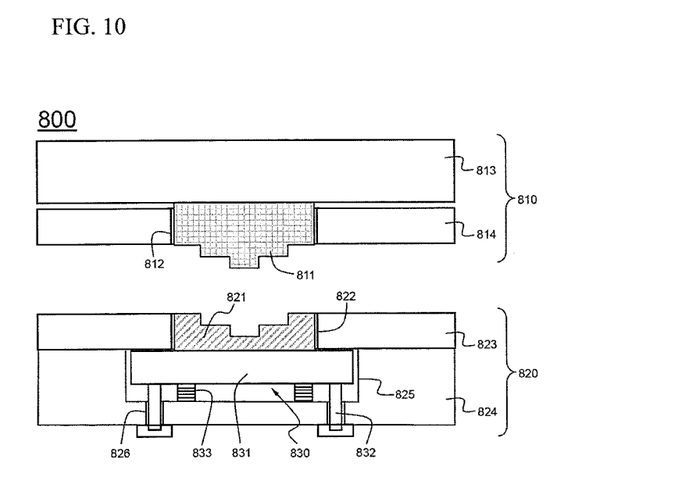
FIG. 10 is a vertical sectional view showing a battery case manufacturing apparatus with a punch according to an embodiment of the present invention.

FIG. 10 is a vertical sectional view showing a battery case manufacturing apparatus with a punch according to an embodiment of the present invention.

Referring to FIG. 10, a battery case manufacturing apparatus 800 includes a second die 820, to which a variable die 830 including a block 821 is mounted, and a first die 810 to press a battery case sheet (not shown).

The first die 810 includes a punching die 813. To the lower side of the punching die 813 of the first die 810 are mounted a punch 811 to form a receiving part of an electrode assembly (not shown) and a stripper 814 having a first through opening 812, through which the punch 811 is inserted. The stripper 814 directly presses the battery case sheet (not shown).

The second die 820 includes a mounting die 824, to which the variable die 830 is mounted and which has a depressed part 825, and a stationary die 823 having a second through opening 822, through which the block 821 of the variable die 830 is inserted. The block 821 corresponds to the shape of the punch 811.

Specifically, the depressed part 825, which is approximately configured in a quadrangular shape, is formed at the mounting die 824 of the second die 820. At the depressed part 825 are formed two through holes 826, through which mounting shafts 832 of the variable die 830 are inserted, such that variable movement of the variable die 830 with respect to the mounting die 824 is induced. Consequently, the variable die 830 is mounted in the depressed part 825 and the through holes 826 such that the variable die 830 can be variably reciprocated upward and downward. The battery case sheet (not shown) is supplied from the top of the second die 820 in one direction.

Meanwhile, four compression springs 833 are disposed between the block die 831 and the mounting die 824 such that the variable die 830 can be variably reciprocated upward and downward in the second die 820 with ease.

Although corners of the punch and dies are shown as being formed in a quadrangular shape, the punch and dies shown in FIG. 10 may be rounded in the same manner as shown in FIGS. 7 and 8.

Hereinafter, the operation of the battery case manufacturing apparatus will be described in detail with reference to the above drawings.

First, a battery case sheet (not shown) is supplied to the top of the second die 820 of the battery case manufacturing apparatus 800 according to the present invention from the side of the battery case manufacturing apparatus. In addition, the first die 810 is moved downward to the second die 820 such that the stripper 814 of the first die 810 fixes the battery case sheet in a tight contact state. Before punching or forming the battery case sheet, the stripper 814 may independently move from the first die 810. When the first die 810 and the second die 820 move toward each other, the stripper 814 may press the battery case sheet between the stripper 814 and the stationary die 823 to fix the battery case sheet. The downward movement of the first die 810 is continued so that the punch 811 of the punching die 813 is inserted into the second through opening 822 of the stationary die 824 while the punch 811 of the punching die 813 presses the battery case sheet. Specifically, the punch 811 of the punching die 813 is inserted into an opening of the block 821. At this time, the block die 831 is elastically moved downward from the second through opening 822 and the depressed part 825 to the mounting die 824 by the physical downward insertion of the punch 811 such that a receiving part is formed at the battery case sheet by drawing. Subsequently, the first die 810 is moved upward such that the block die 831 returns to the original position thereof. As a result, the battery case sheet having the receiving part formed thereat is separated from the second die 820.

In addition, the method using the apparatus shown in FIG. 10 may include a process of applying a vacuum to the block 821 as previously described in connection with the embodiment shown in FIG. 4.

Meanwhile, the electrode assembly may include cathodes, anodes, and separators disposed respectively between the cathodes and the anodes. In addition, the electrode assembly may be configured to have a structure in which the cathodes and the anodes are respectively welded to two electrode terminals in a protruding state. The electrodes may be formed in a plate shape. The plate-shaped electrodes may be stacked along a central axis of the electrode assembly. An asymmetric structure with respect to the central axis of the electrode assembly may be formed at at least one side of the electrode assembly constituting the outer circumference of the electrode assembly. The surface area of each plate-shaped electrode of the electrode assembly may be defined as surface area of a plane of each plate-shaped electrode perpendicular to the central axis of the electrode assembly. The surface area of one of the plate-shaped electrodes may be smaller than that of another plate-shaped electrode. The electrode assembly may be configured to have a jelly roll type structure or a stacked type structure. However, the structure of the electrode assembly is not particularly restricted.

The stacked type electrode assembly may include a first electrode group configured to have a structure in which a cathode plate, an anode plate, and separator plates are laminated while being stacked such that the cathode plate or the anode plate and one of the separator plates are located at the outermost sides of the stacked type electrode assembly.

In addition, the stacked type electrode assembly may include a second electrode group configured to have a structure in which a cathode plate, an anode plate, and separator plates are laminated while being stacked such that the separator plates are located at the outermost sides of the stacked type electrode assembly.

For example, the first electrode group may be configured to have a structure in which a cathode plate, a separator plate, an anode plate, and a separator plate are laminated while being sequentially stacked or a structure in which an anode plate, a separator plate, a cathode plate, and a separator plate are laminated while being sequentially stacked.

The stacked type electrode assembly may be configured to have a structure in which only the first electrode groups are stacked.

The stacked type electrode assembly may include a third electrode group configured to have a structure in which a cathode plate, an anode plate, and a separator plate are laminated while being stacked in a state in which the separator plate is disposed between the cathode plate and the anode plate such that the cathode plate and the anode plate are located at the outermost sides of the stacked type electrode assembly.

The stacked type electrode assembly may include a fourth electrode group configured to have a structure in which a cathode plate or an anode plate and a separator plate are laminated while being stacked.

The stacked type electrode assembly may be configured to have a structure in which only first electrode groups are stacked, a structure in which only second electrode groups are stacked, a structure in which only third electrode groups are stacked, a structure in which only fourth electrode groups are stacked, or a structure in which the first, second, third, and fourth electrode groups are combined.

The second electrode group may be stacked at the uppermost end or the lowermost end of the first electrode group.

In the structure in which only the second electrode groups are stacked, a cathode plate or an anode plate may be disposed between the second electrode groups.

A fixing member to more securely maintain the stack structure of the cathode plate, the separator plate, and the anode plate may be added to the first electrode group to the fourth electrode group.

The fixing member may be an additional external member different from the first electrode group to the fourth electrode group. The fixing member may be an adhesive tape or a bonding tape to cover a portion or the entirety of the outside of each of the electrode groups.

The outside of each of the electrode groups may include sides, a top, a front, and a rear of each of the electrode groups.

The fixing member may be a portion of the separator plate constituting the first electrode group to the fourth electrode group. In this case, the ends of the separator plate may be thermally welded to fix the first electrode group to the fourth electrode group. However, the present invention is not limited thereto.

Ends of the separator plate may extend such that the separator plate has a length larger than the size of the cathode plate and the anode plate, i.e. the horizontal length or the vertical length. The extending ends of the separator may be connected to each other by thermal welding.

The fixing member may include all members that are capable of fixing the first electrode group to the fourth electrode group.

In a case in which the stacked type electrode assembly is configured to include the first electrode group and the second electrode group, it possible to improve productivity and yield as compared with the stacked type electrode assembly configured to have a structure in which the cathode plate, the anode plate, and the separator plate are simply stacked.

In addition, the cathode plate, the separator plate, and the anode plate are laminated in unit of the first electrode group, and therefore, it is possible to minimize expansion in volume of the stacked type electrode assembly due to swelling.

In a case in which the stacked type electrode assembly is configured to include the first electrode group and the second electrode group, misalignment of the electrode assembly caused during a folding process is prevented and omission of processing equipment is possible. In addition, it is possible to form the first electrode group or the second electrode group using only one laminator. In addition, it is possible to manufacture the stacked type electrode assembly by simple stacking. Consequently, damage to electrodes caused during the folding process may be reduced and electrolyte wettability may be improved. Furthermore, a single-sided organic and inorganic composite separator, e.g. a safety reinforced separator (SRS), may be used as the separator plate exposed outside. Consequently, cell thickness may be decreased and, at the same time, processing cost may be reduced.

Figure 11:
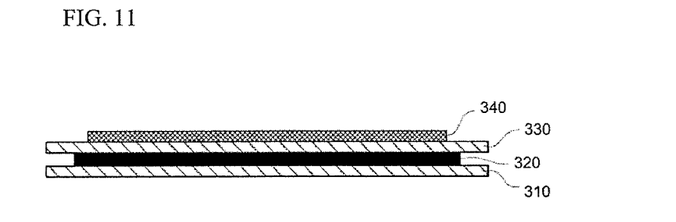
FIG. 11 is a view showing the structure of a first electrode group according to an embodiment of the present invention.

As shown in FIG. 11, a first electrode group is configured to have a structure in which a separator plate 310, a cathode plate 320, a separator plate 330, and an anode plate 340 are laminated while being sequentially stacked.

Figure 12:
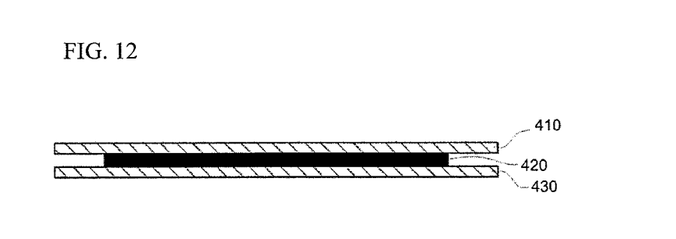
FIG. 12 is a view showing the structure of a second electrode group according to an embodiment of the present invention.

As shown in FIG. 12, a second electrode group is configured to have a structure in which a separator plate 410, an anode plate 420, and a separator plate 430 are laminated while being sequentially stacked.

Figure 13:
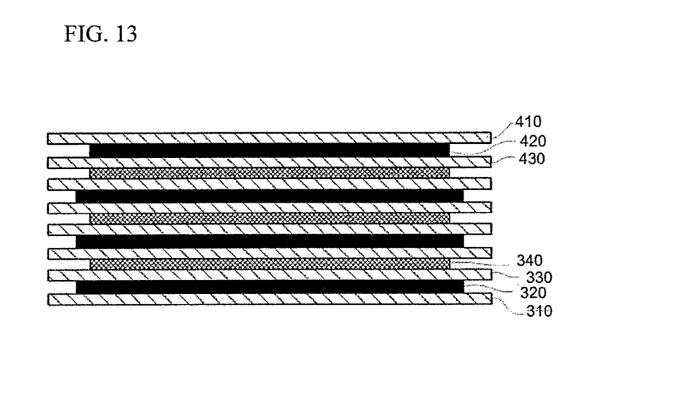
FIG. 13 is a typical view showing a stacked type electrode assembly according to an embodiment of the present invention.

FIG. 13 shows a stacked type electrode assembly configured to have a structure in which the second electrode group of FIG. 12 is stacked on the uppermost end of a first electrode group stack constituted by first electrode groups, one of which is shown in FIG. 11.

Figure 14:
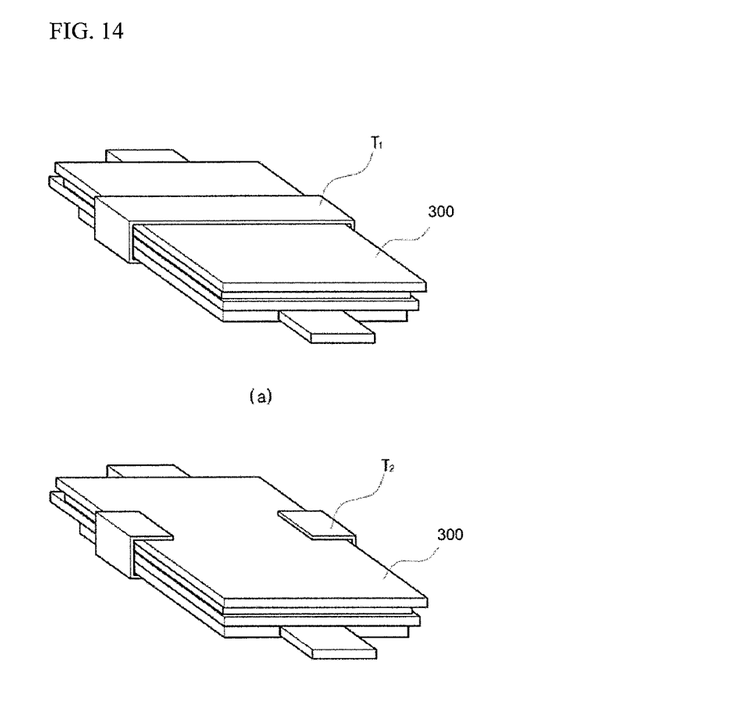
FIG. 14 is a typical view showing a fixing structure of the first electrode group of FIG. 12.

FIG. 14 shows an embodiment in which a fixing member $T_1$ is added to the first electrode group of FIG. 11. Specifically, the fixing member $T_1$ is added to the side or the front of the first electrode group 300.

In order to secure stack stability of a simple stack structure, an additional fixing member may be added to the side of the stack structure to fix the stack structure. The fixing member may be realized as a tape $T_1$ surrounding the entire surface of the first electrode group 300 as shown in FIG. 14(a). Alternatively, the fixing member may be realized as a fixing member $T_2$ to fix only each side of the electrode group 300 as shown in FIG. 14(b).

Figure 15:
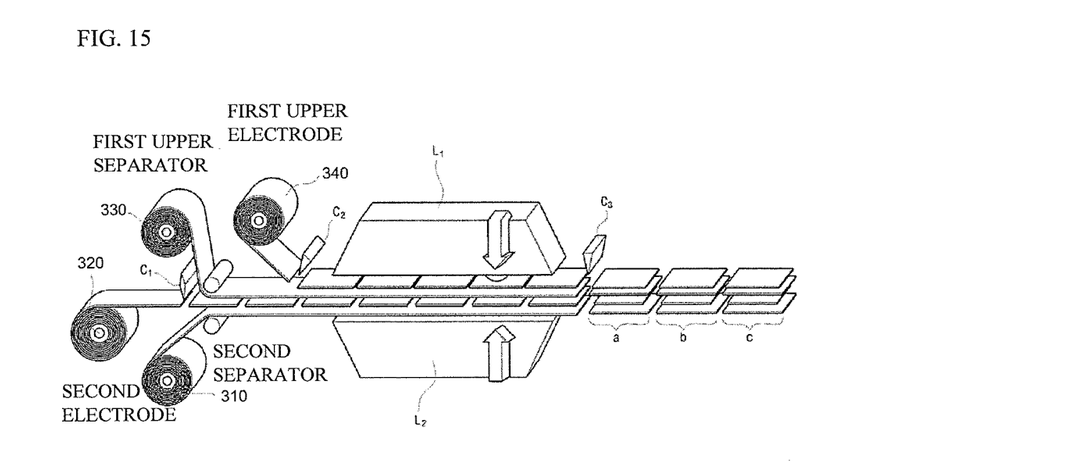
FIG. 15 is a view showing a process of manufacturing a first electrode group according to an embodiment of the present invention.

FIG. 15 is a view typically showing a process of manufacturing the first electrode group according to the present invention.

As shown in FIG. 15, materials for a separator plate 310, a cathode plate 320, a separator plate 330, and an anode plate 340 are simultaneously loaded (using sheet type loading units). The material for the cathode plate 320, which is used as a middle layer, is cut into a designed size and is then loaded into laminators $L_1$ and $L_2$. Subsequently, the materials for the separator plates 310 and 330, which are disposed under and above the material for the cathode plate 320, are simultaneously loaded into the laminators $L_1$ and $L_2$. At the same time, the material for the anode plate 340 is loaded into the laminators $L_1$ and $L_2$.

Subsequently, the laminators $L_1$ and $L_2$ form a structural body in which the two electrode plates and the two separator plates are laminated to each other using heat and pressure, i.e. a first electrode group. Subsequently, a cutter $C_3$ cuts the structural body into a plurality of first electrode groups. Afterwards, various inspection processes, such as a thickness inspection (a), a vision inspection (b), and a short circuit inspection (c), may be performed with respect to each first electrode group.

Subsequently, each first electrode group manufactured as described above is fixed using a fixing member, and the first electrode groups are stacked to constitute a structural body in which the first electrode groups are stacked. Subsequently, the second electrode group shown in FIG. 12 is stacked on the structural body and then the second electrode group and the structural body are fixed using a fixing member, thereby completing a stacked type electrode assembly.

Figure 16:
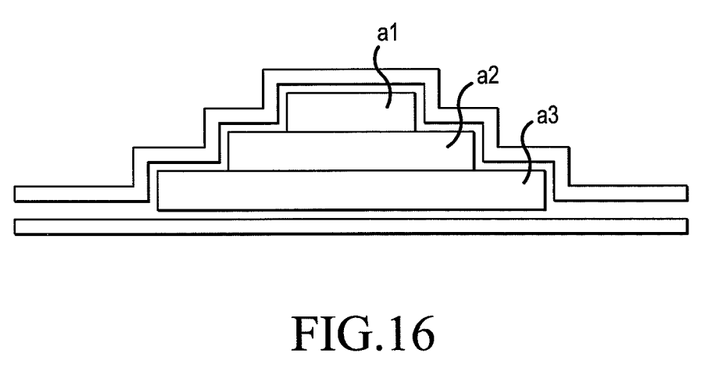
FIG. 16 is a view showing a stair-like stacked electrode assembly according to an embodiment of the present invention.

FIG. 16 shows a stair-like stacked electrode assembly according to an embodiment of the present invention.

As shown in FIG. 16, the stair-like electrode assembly includes a relatively small sized electrode group a1, a relatively medium sized electrode group a2 and a relatively large sized electrode group a3. Each of the electrode groups a1, a2, a3 may be configured by alternately laminating one or more positive electrode plates and negative electrode plates with a separator located between each electrode plate. Each of the electrode groups may be sized differently to provide different stair-like shapes. As shown, the battery case may be configured to correspond to the outer extent of each electrode group.

The number of electrode groups having different plane sizes constituting the electrode assembly may be flexibly adjusted by those skilled in the art based on the shape or required capacity of a device in which the electrode groups are mounted. For example, the electrode assembly may include two or three electrode groups. Alternatively, the electrode assembly may include four or more electrode groups.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery case comprising a receiving part having an electrode assembly mounted therein, wherein the receiving part, which is formed by deforming a sheet type base material, is configured to have a stair structure in which at least one corner or surface forming a shape of the receiving part is deformed, wherein the receiving part has a side wall configured to have the stair structure, the stair structure comprising two or more steps, the steps forming right angles in cross-section, and the steps have heights gradually decreased in a depth direction of the receiving part.

2. The battery case according to claim 1, wherein the base material is formed of a laminate sheet comprising a resin layer and a metal layer.

3. The battery case according to claim 2, wherein the base material comprises an upper layer of a first polymer resin, an intermediate layer of a blocking metal, and a lower layer of a second polymer resin.

4. The battery case according to claim 1, wherein the base material has a thickness of 0.3 mm to 6 mm.

5. The battery case according to claim 1, wherein, when the stair structure comprises n steps, an n-th step is located at a lowermost end of the stair structure in the depth direction of the receiving part, an (n−1)-th step is located at a top of the n-th step, and the n-th step has a smaller height than the (n−1)-th step.

6. The battery case according to claim 5, wherein the height of the n-th step is equivalent to 50 to 90% of that of the (n−1)-th step.

7. The battery case according to claim 5, wherein a thickness of the side wall of the receiving part at the n-th step is equivalent to 90 to 99% of that of the side wall of the receiving part at the (n−1)-th step.

* * * * *